US012692853B2

(12) United States Patent
    Huffman

(10) Patent No.: US 12,692,853 B2
(45) Date of Patent: Jul. 28, 2026

(54) AIR COMPRESSOR FOR A VEHICLE AIR BRAKING SYSTEM

(71) Applicant: Knorr-Bremse AG, Munich (DE)

(72) Inventor: Justin R. Huffman, Willoughby, OH (US)

(73) Assignee: KB Intellectual Property GmbH & Co. KG, Pullach i. Isartel (DE)

( * ) Notice: Subject to any disclaimer, the term of this patent is extended or adjusted under 35 U.S.C. 154(b) by 112 days.

(21) Appl. No.: 18/734,427

(22) Filed: Jun. 5, 2024

(65) Prior Publication Data

US 2025/0376978 A1     Dec. 11, 2025

(51) Int. Cl.
    *F01P 1/06*     (2006.01)
    *F04B 39/06*    (2006.01)
    *F04B 39/10*    (2006.01)
    *F04B 39/12*    (2006.01)
    *B60T 17/02*    (2006.01)

(52) U.S. Cl.
    CPC ............ *F04B 39/125* (2013.01); *F04B 39/06* (2013.01); *F04B 39/1066* (2013.01); *F04B 39/128* (2013.01); *B60T 17/02* (2013.01)

(58) Field of Classification Search
    CPC .. F04B 39/1073; F04B 39/125; F04B 39/064; F25B 1/04; F25B 1/10; B60T 17/02
    USPC ...................................... 123/41.34
    See application file for complete search history.

(56) References Cited

U.S. PATENT DOCUMENTS

| | | | | |
|---|---|---|---|---|
| 2,151,746 | A * | 3/1939 | Cody | F04B 39/1073 137/856 |
| 2,510,887 | A * | 6/1950 | Hanson | F04B 39/064 62/505 |
| 5,454,397 | A | 10/1995 | Miszczak | |
| 6,053,713 | A * | 4/2000 | Brown | F04B 39/064 417/571 |
| 6,116,874 | A * | 9/2000 | Nation | F04B 39/064 417/571 |
| 6,193,475 | B1 * | 2/2001 | Rozek | F04B 35/04 417/415 |
| 8,117,960 | B2 | 2/2012 | Hartl et al. | |
| 9,114,789 | B2 | 8/2015 | Cellura | |

(Continued)

FOREIGN PATENT DOCUMENTS

| | | |
|---|---|---|
| CN | 101876309 A | 11/2010 |
| CN | 116380447 A | 7/2023 |

(Continued)

OTHER PUBLICATIONS

European Patent Office, "International Search Report and Written Opinion," report, Jul. 1, 2025, 19 pages, Rijswijk Netherlands.

*Primary Examiner* — Logan M Kraft
*Assistant Examiner* — James J Kim
(74) *Attorney, Agent, or Firm* — Cheryl L. Greenly; Brian E. Kondas; Geoffrey A. Kudlo

(57) ABSTRACT

A vehicle air compressor comprises a crankcase having a longitudinal central axis. The vehicle air compressor also comprises a head assembly including (i) a rear face that lies in a plane transverse to the longitudinal central axis of the crankcase, (ii) an air inlet port oriented in the same plane as the rear face, (iii) an air outlet port oriented in the same plane as the rear face, (iv) a coolant inlet port oriented in the same plane as the rear face, and (v) a coolant outlet port oriented in the same plane as the rear face.

17 Claims, 4 Drawing Sheets

(56)                    References Cited

U.S. PATENT DOCUMENTS

| | | | |
|---|---|---|---|
| 9,651,040 B2 | 5/2017 | Colavincenzo et al. | |
| 9,920,848 B2 | 3/2018 | Ubaldino | |
| 9,994,207 B2 | 6/2018 | Yeats | |
| 10,174,755 B2 | 1/2019 | Geither | |
| 10,288,180 B2 | 5/2019 | Ubaldino | |
| 2009/0071324 A1* | 3/2009 | Hartl | F04B 39/064 |
| | | | 92/144 |
| 2013/0259719 A1* | 10/2013 | Ichihara | F04B 41/02 |
| | | | 417/364 |
| 2016/0177936 A1* | 6/2016 | Harte | F04B 39/0061 |
| | | | 417/559 |
| 2017/0037843 A1* | 2/2017 | Yeats | B60T 17/02 |
| 2017/0321693 A1* | 11/2017 | Geither | F04B 53/1047 |
| 2018/0156209 A1 | 6/2018 | Kay et al. | |
| 2019/0211827 A1* | 7/2019 | Kovacsik | B60T 17/02 |

FOREIGN PATENT DOCUMENTS

| | | |
|---|---|---|
| CN | 116928060 A | 10/2023 |
| EP | 0093674 A1 | 11/1983 |

* cited by examiner

AIR COMPRESSOR FOR A VEHICLE AIR BRAKING SYSTEM

BACKGROUND

The present application relates to air compressors, and is particularly directed to an air compressor for a vehicle air braking system, such as a truck air braking system.

A truck air braking system includes a vehicle air compressor which builds air pressure for the air braking system. A governor controls system air pressure between a preset maximum pressure level and a preset minimum pressure level by monitoring the air pressure in a supply reservoir. When the supply reservoir air pressure becomes greater than that of a preset "cut-out" setting of the governor, the governor controls the compressor to stop the compressor from building air. As the supply reservoir air pressure drops to a preset "cut-in" setting of the governor, the governor returns the compressor back to building air pressure.

The vehicle air compressor is usually a reciprocating air compressor and runs continuously. The compressor runs either in a loaded mode or an unloaded mode. When the compressor is running in the loaded mode, compressed air is delivered to the air braking system. When the compressor is running in the unloaded mode, compressed air is directed to an alternate place which is other than the air braking system. Also, when the compressor is running in the unloaded mode, an unloader valve releases pressurized air building up inside the compressor to reduce the pressurized air in the compressor, which in turn reduces the load on the device driving the compressor. This minimizes power consumption during operation of the compressor in the unloaded mode.

During operation of a typical vehicle air compressor, intake air is directed through an air intake port into the compressor, compressed air is delivered through an air discharge port away from the compressor, cooled coolant is received through a coolant inlet port into the compressor, and high-temperature coolant passes through a coolant outlet port away from the compressor.

A drawback in known vehicle air compressors is that the four ports of the compressor open in multiple directions away from multiple faces of the compressor. Since the four ports of the compressor open in multiple directions away from the compressor, it is often difficult to physically connect and disconnect air hoses and coolant hoses to these four ports.

Despite advances already made, those skilled in the art continue with research and development efforts in the field of air compressors including vehicle air compressors.

SUMMARY

In accordance with one embodiment, a vehicle air compressor comprises a crankcase having a longitudinal central axis. The vehicle air compressor also comprises a head assembly including (i) a rear face that lies in a plane transverse to the longitudinal central axis of the crankcase, (ii) an air inlet port oriented in the same plane as the rear face, (iii) an air outlet port oriented in the same plane as the rear face, (iv) a coolant inlet port oriented in the same plane as the rear face, and (v) a coolant outlet port oriented in the same plane as the rear face.

In accordance with another embodiment, a vehicle air compressor comprises a crankcase having a longitudinal central axis, and a cylinder head. The vehicle air compressor also comprises at least one inlet reed valve positioned between the crankcase and the cylinder head and having a tongue axis that is transverse to the longitudinal central axis of the crankcase.

In accordance with yet another embodiment, an air compressor comprises a compressor head assembly defining an air inlet port, an air outlet port, a coolant inlet port, and a coolant outlet port. The four ports are oriented in a common plane as a single face of the compressor head assembly.

In accordance with still another embodiment, a method is provided of operating an air compressor having a rear face that lies in a plane. The method comprises receiving intake air through an air intake port oriented in the same plane as the rear face of the air compressor. The method also comprises delivering compressed air through an air discharge port oriented in the same plane as the rear face of the air compressor. The method further comprises receiving cooled coolant through a coolant inlet port oriented in the same plane as the rear face of the air compressor. The method also comprises delivering high-temperature coolant through a coolant outlet port oriented in the same plane as the rear face of the air compressor.

DETAILED DESCRIPTION

The present application is directed to air compressors. The specific construction of the air compressor and the industry in which the air compressor is implemented may vary. It is to be understood that the disclosure below provides a number of embodiments or examples for implementing different features of various embodiments. Specific examples of components and arrangements are described to simplify the present disclosure. These are merely examples and are not intended to be limiting. By way of example, the disclosure below describes an air compressor embodied in a vehicle air braking system.

Figure 1:
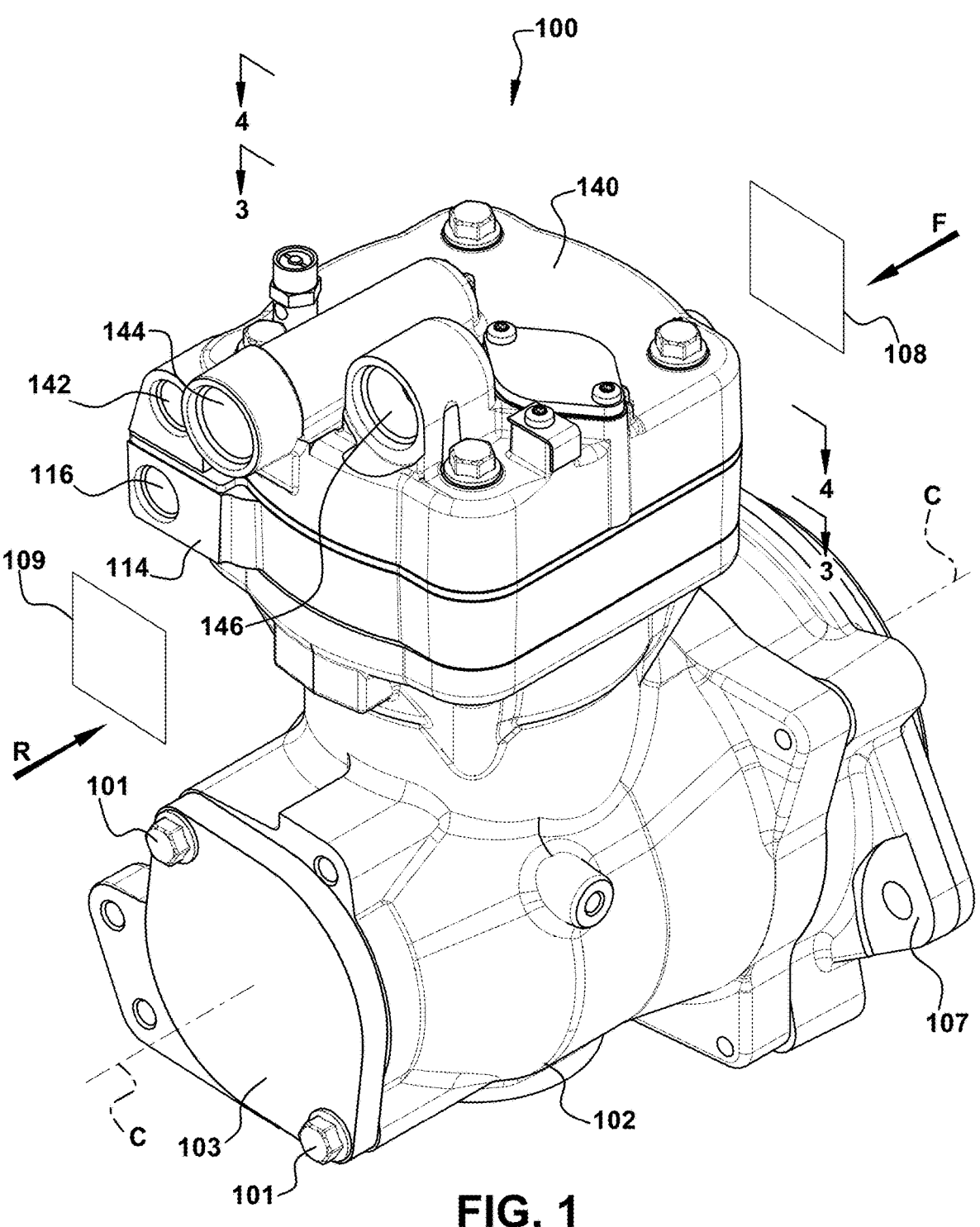
FIG. 1 is a perspective view of a vehicle air compressor constructed in accordance with an embodiment.
Figure 2:
FIG. 2 is a full-exploded view of the vehicle air compressor of FIG. 1.

Referring to FIG. 1, a perspective view of a vehicle air compressor 100 constructed in accordance with an embodiment is illustrated. FIG. 2 is a full-exploded view of the vehicle air compressor 100 of FIG. 1. The vehicle air compressor 100 comprises a crankcase 102 having a longitudinal central axis "C". The crankcase 102 contains a piston 104 for compressing air. Fasteners 105 secure a compressor mounting plate 107 to front face of the crankcase 102 to house the piston 104 and the crankshaft 106 within the crankcase 102.

The piston 104 is operatively coupled to a crankshaft 106 and reciprocates along piston axis "P" during operation of the compressor 100. Structure and operation of the piston 104 and the crankshaft 106 within the crankcase 102 during operation of the compressor 100 are known and conventional and, therefore, will not be described.

The compressor 100 has a front face, looking approximately in the direction of arrow "F" in FIG. 1, that lies in a first plane 108 transverse to the longitudinal central axis C of the crankcase 102. The compressor 100 has a rear face, looking approximately in the direction of arrow "R" in FIG. 1, that lies in a second plane 109 transverse to the longitudinal central axis C of the crankcase 102. The first and second planes 108, 109 are substantially parallel to each other. Fasteners 101 secure a rear face cover 103 to the crankcase 102 when the compressor 100 is not connected to a power take-off device.

The compressor 100 receives several components to construct a compressor head assembly 110 for directing intake air, coolant, and compressed air. At least one inlet reed valve with an integral gasket 112 (only one inlet reed valve shown in FIG. 2) is positioned on top of the crankcase 102. The inlet reed valve 112 has a tongue axis "T" that extends transverse (e.g., perpendicular) to the longitudinal central axis C of the crankcase 102.

A valve plate 114 is placed on top of the tongue-shaped inlet reed valve 112. The valve plate 114 has a coolant inlet port 116. First and second discharge reed valves 121, 122 are mounted on top of the valve plate 114. Structure and operation of inlet reed valves and discharge reed valves are known and conventional and, therefore, will not be described.

A baffle plate 130 is sandwiched between first and second head gaskets 131, 132. The baffle plate 130 is mounted on top of the first head gasket 131 which, in turn, is mounted on top of the first and second discharge reed valves 121, 122 and the valve plate 114. The baffle plate 130 provides flow management. In particular, the baffle plate 130 separates the fluid flow between, and directs the fluid flow between cylinder head 140 and the valve plate 114.

A cylinder head 140 is mounted on top of the second head gasket 132 which, in turn, is mounted on top of the baffle plate 130. The cylinder head 140 has a coolant outlet port 142, an air inlet port 144, and an air outlet port 146. Fasteners 148 secure components of the compressor head assembly 110 to the crankcase 102.

An unloader valve 150 is positioned within the cylinder head 140. The unloader valve 150 has a longitudinal central axis "U" that lies parallel to the piston axis P and transverse to the longitudinal central axis C. The longitudinal central axis U of the unloader valve 150 is also offset relative to the longitudinal central axis C of the crankcase 102 such that the longitudinal central axes U, C are non-intersecting. Structure and operation of an unloader valve in a vehicle air compressor application are known and, therefore, will not be described.

In accordance with an aspect of the present disclosure, the tongue axis T of the inlet reed valve 112 extends transverse (e.g., perpendicular) to the longitudinal central axis C of the crankcase 102. By having the tongue axis T extend transverse to the longitudinal central axis C (in contrast to the tongue axis of an inlet reed valve extending parallel to the longitudinal central axis of a crankcase in known vehicle air compressors), a number of advantages result, as will be described herein.

In accordance with another aspect of the present disclosure, the valve plate 114 and the cylinder head 140 cooperate together to define the air inlet port 144, the air outlet port 146, the coolant inlet port 116, and the coolant outlet port 142, such that these four ports are oriented in the same plane as one face (i.e., a single face) of the compressor 100, as will also be described herein.

Figures 3, 4:
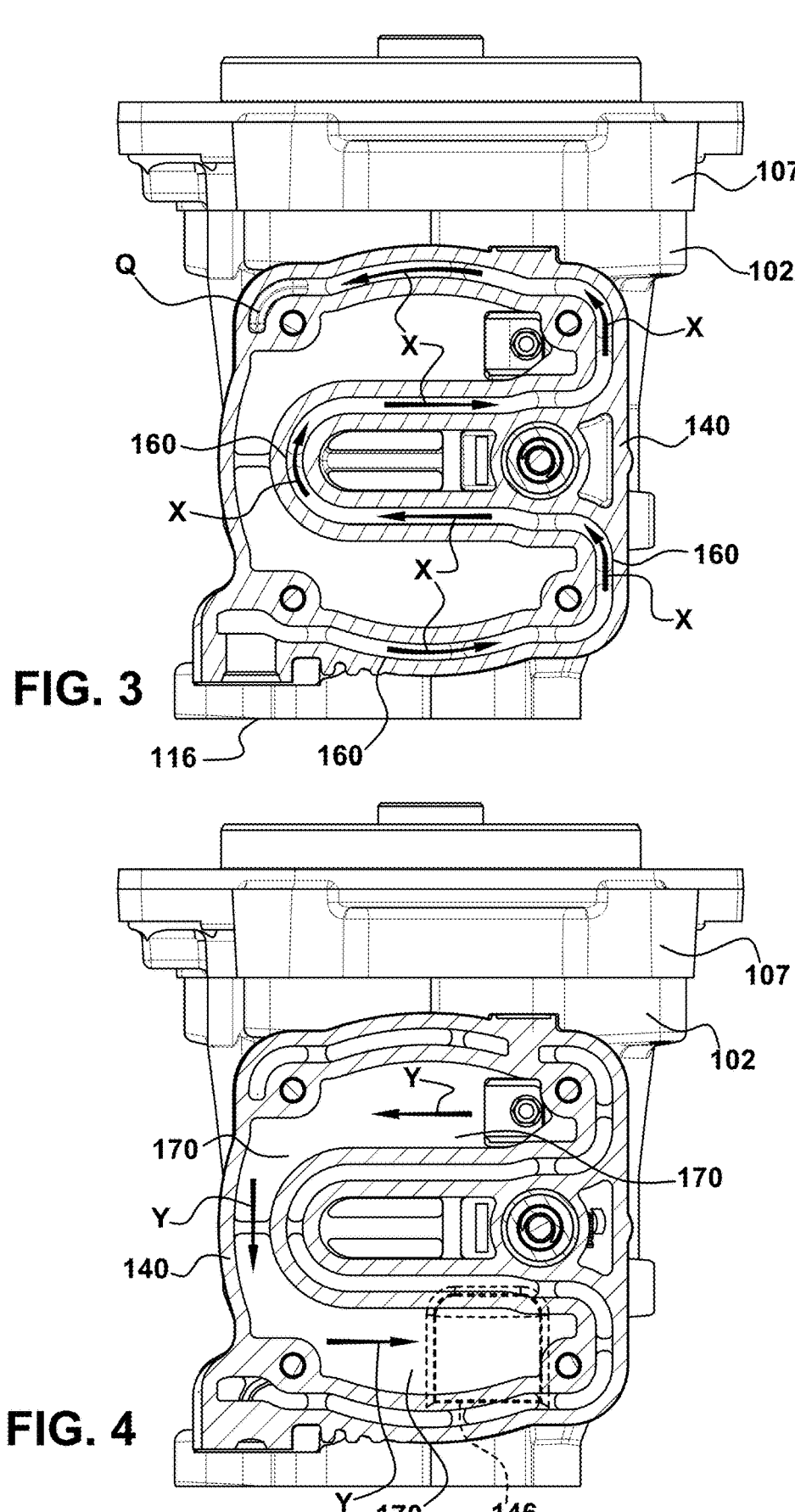
FIG. 3 is a sectional view, taken approximately along line 3-3 shown in FIG. 1, and showing an internal coolant passage and direction of coolant flow within the compressor.
FIG. 4 is a sectional view, taken approximately along line 4-4 shown in FIG. 1, and showing an internal discharge air passage and direction of discharge air flow within the compressor.

Referring to FIG. 3, a sectional view, taken approximately along line 3-3 shown in FIG. 1, is illustrated. FIG. 3 shows an internal coolant passage 160 and direction of coolant flow, designated with arrows "X" within the compressor 100. The coolant passage 160 is defined within the cylinder head 140, and is serpentine-shaped. In some implementations such as shown in FIG. 3, the coolant passage 160 is substantially W-shaped. During operation of the compressor 100, cooled coolant enters through the coolant inlet port 116 and flows through the serpentine-shaped coolant passage 160 to cool components of the compressor 100.

After the coolant flows through the serpentine-shaped coolant passage 160 in the valve plate 114 (not shown), the coolant then flows upward, approximately in the area designated "Q" in FIG. 3, into a cooling passage in the cylinder head 140. The coolant in the cylinder head 140 then follows a similar serpentine-shaped path in the reverse direction to that shown in FIG. 3 until the coolant reaches the coolant outlet port 142 in the cylinder head 140. Accordingly, the coolant traverses two serpentine-shaped internal cooling passages to cool components of the compressor 100 during operation of the compressor 100.

Referring to FIG. 4, a sectional view, taken approximately along line 4-4 shown in FIG. 1, is illustrated. FIG. 4 shows an internal discharge air passage 170 and direction of discharge air flow, designated with arrows "Y" within the compressor 100. The discharge air passage 170 is defined within the cylinder head 140, and is substantially U-shaped. During operation of the compressor 100, intake air (e.g., ambient air) enters through the air inlet port 144 and is suctioned directly downward into a cylinder bore of the crankcase 102 via the inlet reed valve 112 (which has opened during the suction stroke) to compress the intake air. The compressed air is then directed through the discharge air passage 170 to the air outlet port 146 to be delivered away from the compressor 100.

It should be apparent that means is provided to interconnect at least in part the air inlet port 144 and the air outlet port 146, and to interconnect at least in part the coolant inlet port 116 and the coolant outlet port 142. The four ports 116, 142, 144, 146 are oriented in the same plane (i.e., a common plane) as the plane 109 that is transverse to the longitudinal central axis C of the crankcase 102, as shown looking in the direction of arrow R in FIG. 1. Moreover, fluid flow of both intake and discharge air and fluid flow of coolant both into and out of the compressor 100 are in-line with the longitudinal central axis C of the crankcase 102.

A number of advantages result by providing the vehicle air compressor 100 in accordance with the above-described description in which the tongue axis T of the inlet reed valve 112 is rotated in an orientation that extends transverse to the longitudinal central axis C of the crankcase 102. This feature is in contrast to known existing vehicle air compressors in which their tongue axes extend parallel to the longitudinal central axes of their crankcases.

One advantage is that service personnel and customers can easily access the four ports 116, 142, 144, 146 of the compressor 100 from a single direction since these four ports are oriented in the same plane as a single face (e.g., the rear face as described herein) of the compressor 100. The four ports 116, 142, 144, 146 open in a single direction away from a single face of the compressor 100. It is conceivable that four ports may be oriented in the same plane as a face which is other than the rear face. For example, it is conceivable that the four ports 116, 142, 144, 146 be oriented in the same plane as the front face of the compressor 100.

Another advantage is that the serpentine-shaped internal coolant passage 160 in the valve plate 114 (and also the corresponding serpentine-shape coolant passage in the cylinder head 140 as described hereinabove) provides a double-winding and tortuous cooling path. Two serpentine-shaped internal coolant passages (i.e., first and second serpentine-shaped internal coolant passages) cooperate together to provide more cooling surface area within the head assembly 110 (FIG. 2). More cooling surface area within the head assembly 110 provides enhanced and improved cooling of components of the head assembly 110 during operation of the compressor 100.

Yet another advantage is that the unloader valve 150 is located farther away from the engine (not shown) of the vehicle in which the compressor 100 is installed, as compared to unloader valves in known existing vehicle air compressors. Since the unloader valve 150 is farther away from the vehicle engine, the unloader valve 150 operates cooler than unloader valves in the known existing vehicle air compressors.

Figure 5:
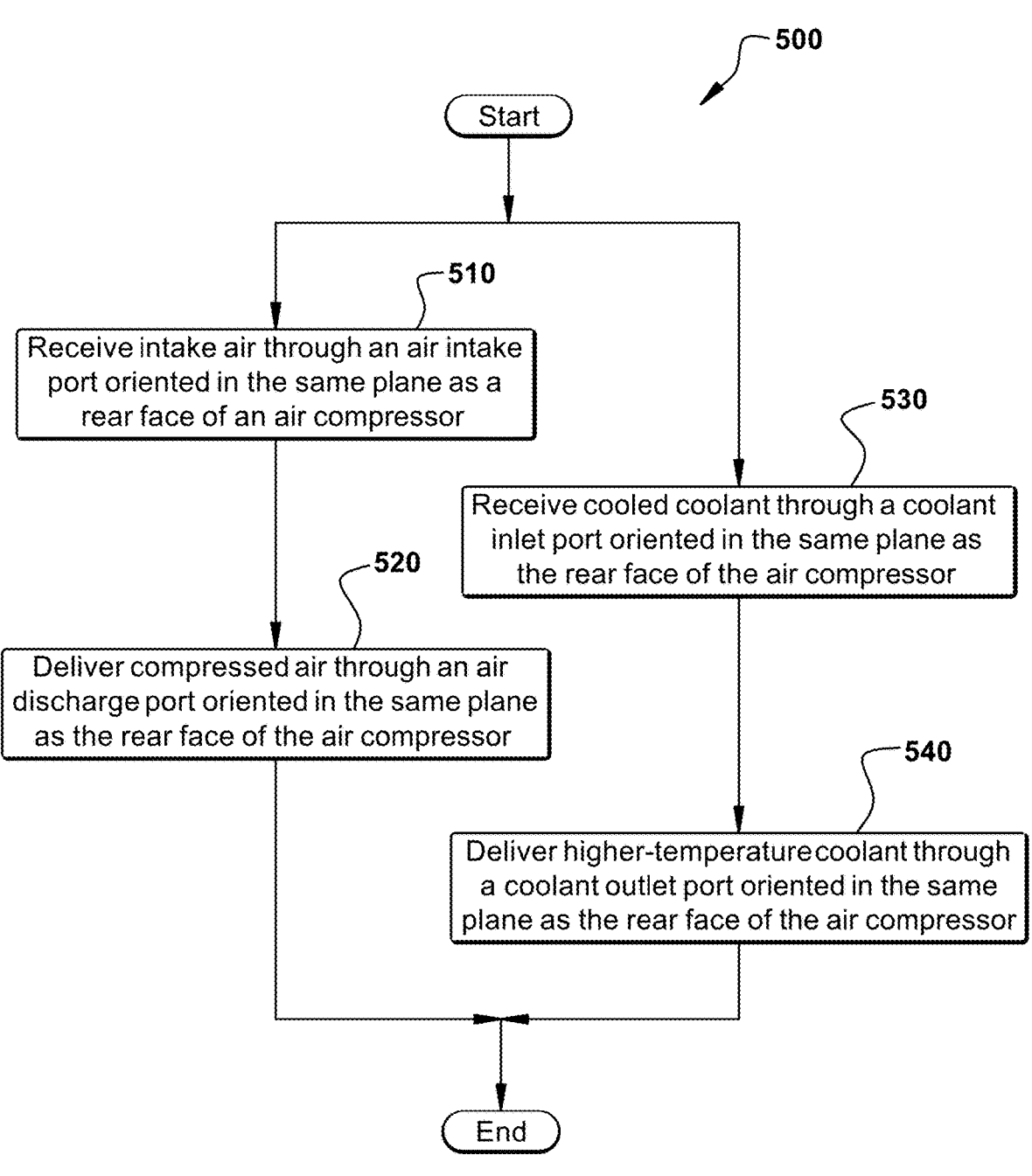
FIG. 5 is a flow diagram depicting a method of operating an air compressor in accordance with an embodiment.

Referring to FIG. 5, a flow diagram 500 depicts a method of operating an air compressor in accordance with an embodiment. In block 510, intake air is received through an air intake port oriented in the same plane as a rear face of the air compressor. Then in block 520, compressed air is delivered through an air discharge port oriented in the same plane as the rear face of the air compressor. At the same time as shown in block 530, cooled coolant is received through a coolant inlet port oriented in the same plane as the rear face of the air compressor. Then in block 540, high-temperature coolant is delivered through a coolant outlet port oriented in the same plane as the rear face of the air compressor. The process then ends.

In some embodiments, the cooled coolant is passed through a substantially double-winding W-shaped internal coolant passage to allow the cooled coolant to cool components of the air compressor during operation of the air compressor.

In some embodiments, compressed air is passed through a substantially U-shaped internal air passage during operation of the air compressor.

Although the compressor 100 shown in FIG. 1 is of a reciprocating type, it is conceivable that another type of compressor may be used.

Also, although the above-description describes the compressor 100 being used in a heavy vehicle such as a truck, it is conceivable that compressor 100 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle air compressor comprising:
a crankcase having a longitudinal central axis; and
a head assembly including
    a rear face that lies in a plane transverse to the longitudinal central axis of the crankcase,

a cylinder head, the cylinder head including an air inlet port oriented in the same plane as the rear face, an air outlet port oriented in the same plane as the rear face, and a coolant outlet port oriented in the same plane as the rear face, and
    a valve plate located between the cylinder head and the crankcase, the valve plate including a coolant inlet port oriented in the same plane as the rear face.

2. A vehicle air compressor according to claim 1, wherein the head assembly includes
    at least one inlet reed valve having a tongue axis that is transverse to the longitudinal central axis of the crankcase.

3. A vehicle air compressor according to claim 2 further comprising:
    an unloader valve having a piston axis that is transverse to the longitudinal central axis of the crankcase and is offset relative to the longitudinal central axis such that the piston axis and the longitudinal central axis of the crankcase are non-intersecting.

4. A vehicle air compressor according to claim 1, wherein a portion of the head assembly defines at least in part a serpentine-shaped coolant passage interconnecting the coolant inlet port and the coolant outlet port and through which coolant can flow to cool components of the compressor during operation of the compressor.

5. A vehicle air compressor according to claim 4, wherein the serpentine-shaped coolant passage is substantially W-shaped.

6. A vehicle air compressor according to claim 1, wherein the cylinder head has a substantially U-shaped passage through which compressed air can flow to the air outlet port to be discharged away from the compressor.

7. A vehicle air compressor according to claim 1, wherein the head assembly includes a baffle plate positioned between the cylinder head and the valve plate.

8. A vehicle air compressor comprising:
a crankcase having a longitudinal central axis;
a head assembly having
    a rear face that lies in a plane transverse to the longitudinal central axis of the crankcase,
    a cylinder head, the cylinder head including an air inlet port oriented in the same plane as the rear face, an air outlet port oriented in the same plane as the rear face, and a coolant outlet port oriented in the same plane as the rear face, and
    a valve plate located between the cylinder head and the crankcase, the valve plate including a coolant inlet port oriented in the same plane as the rear face; and
at least one inlet reed valve positioned between the crankcase and the cylinder head and having a tongue axis that is transverse to the longitudinal central axis of the crankcase.

9. A vehicle air compressor according to claim 8 further comprising:
    an unloader valve positioned within the cylinder head and having a longitudinal central axis that lies in a plane transverse to the longitudinal central axis of the crankcase and is offset relative to the longitudinal central axis of the crankcase such that the longitudinal central axes are non-intersecting.

10. A vehicle air compressor according to claim 8 wherein the head assembly further
    defines a serpentine-shaped coolant passage through which coolant can flow to cool components of the compressor during operation of the compressor.

11. A vehicle air compressor according to claim 10, wherein the serpentine-shaped coolant passage is substantially W-shaped.

12. A vehicle air compressor according to claim 10 further comprising:

a baffle plate positioned between the cylinder head and the valve plate.

13. A vehicle air compressor according to claim 8, wherein the cylinder head has a substantially U-shaped passage through which compressed air can flow to be discharged away from the compressor.

14. An air compressor comprising:

a compressor head assembly defining a cylinder head having an air inlet port, an air outlet port, and a coolant outlet port, and a valve plate having a coolant inlet port, wherein the four ports are oriented in a common plane as a single face of the compressor head assembly;

wherein the valve plate has a first serpentine-shaped internal coolant passage and the cylinder head has a second serpentine-shaped internal coolant passage that cooperates with the first serpentine-shaped internal coolant passage to provide enhanced cooling of the compressor head assembly during operation of the compressor.

15. A method of operating an air compressor having a rear face that lies in a plane, the method comprising:

receiving intake air through an air intake port of a cylinder head, the air intake port oriented in the same plane as the rear face of the air compressor;

delivering compressed air through an air discharge port of the cylinder head, the air discharge port oriented in the same plane as the rear face of the air compressor;

receiving cooled coolant through a coolant inlet port of a valve plate, the coolant inlet port oriented in the same plane as the rear face of the air compressor; and delivering high-temperature coolant through a coolant outlet port of the cylinder head, the coolant outlet port oriented in the same plane as the rear face of the air compressor.

16. A method according to claim 15 further comprising:

passing the cooled coolant through a substantially double-winding W-shaped internal coolant passage created by the cooperation of the cylinder head and the valve plate to allow the cooled coolant to cool components of the air compressor during operation of the air compressor.

17. A method according to claim 15 further comprising:

passing compressed air through a substantially U-shaped internal air passage during operation of the air compressor.

* * * * *